United States Patent
Finlow-Bates

(10) Patent No.: US 10,135,616 B2
(45) Date of Patent: Nov. 20, 2018

(54) REVOCATION OF CRYPTOGRAPHIC KEYS IN THE ABSENCE OF A TRUSTED CENTRAL AUTHORITY

(71) Applicant: Keir Finlow-Bates, Kangasala (FI)

(72) Inventor: Keir Finlow-Bates, Kangasala (FI)

(*) Notice: Subject to any disclaimer, the term of this patent is extended or adjusted under 35 U.S.C. 154(b) by 340 days.

(21) Appl. No.: 15/149,089

(22) Filed: May 7, 2016

(65) Prior Publication Data

US 2016/0254910 A1 Sep. 1, 2016

(51) Int. Cl.
| | |
|---|---|
| *H04L 9/08* | (2006.01) |
| *H04L 29/06* | (2006.01) |
| *H04L 29/08* | (2006.01) |
| *G06Q 20/38* | (2012.01) |
| *H04L 9/32* | (2006.01) |

(52) U.S. Cl.
CPC ....... *H04L 9/0891* (2013.01); *G06Q 20/3829* (2013.01); *H04L 9/3268* (2013.01); *H04L 63/0823* (2013.01); *H04L 67/104* (2013.01); *H04L 2209/56* (2013.01)

(58) Field of Classification Search
CPC . H04L 63/0823; H04L 63/108; H04L 67/104; H04L 2209/56; H04L 2463/102; G06Q 20/36; G06Q 20/401; G06Q 20/3825; G06Q 20/3829
See application file for complete search history.

(56) References Cited

U.S. PATENT DOCUMENTS

| | | | |
|---|---|---|---|
| 7,543,140 B2 | 6/2009 | Dillaway | |
| 9,118,486 B2 | 8/2015 | Pritikin | |
| 9,436,935 B2* | 9/2016 | Hudon | G06Q 20/065 |
| 9,667,427 B2* | 5/2017 | Oberhauser | H04L 9/3247 |
| 9,818,092 B2* | 11/2017 | Pennanen | G06Q 20/06 |
| 9,948,467 B2* | 4/2018 | King | H04L 9/3247 |
| 2016/0300223 A1* | 10/2016 | Grey | G06Q 20/3825 |
| 2017/0147808 A1* | 5/2017 | Kravitz | G06F 21/45 |

* cited by examiner

*Primary Examiner* — Zachary A. Davis

(57) ABSTRACT

A method and apparatus are presented for revoking cryptographic keys within a distributed ledger system in which no central trusted authority is available. A key revocation message is sent by a network connected device to other network connected devices over a peer-to-peer network for inclusion in a ledger. In one embodiment the revocation message is signed using a private key of a public/private key pair to be revoked. In another embodiment an authorization for future revocation of the public/private key pair by a plurality of other public/private keys is sent for inclusion in the ledger, and subsequently the key revocation message is signed with one of the private keys of the plurality of other public/private key pairs before sending the key revocation message. Once a valid key revocation message is included in the ledger, any future request to include a message signed by a cryptographic key revoked by the valid key revocation message is rejected.

14 Claims, 6 Drawing Sheets

REVOCATION OF CRYPTOGRAPHIC KEYS IN THE ABSENCE OF A TRUSTED CENTRAL AUTHORITY

TECHNICAL FIELD

The invention relates to computer systems and methods concerned with the revocation of cryptographic keys, and more specifically to the revocation of keys used in signing data in a shared file or ledger, which is distributed, extended and maintained over a peer-to-peer network.

BACKGROUND OF THE INVENTION

In a traditional public key infrastructure, a trusted central authority issues certificates that provide participants with public/private cryptographic key pairs, and similarly the trusted central authority provides a list of compromised keys through the issuing of a revocation list. A number of methods, systems and processes are known for providing a revocation service, for example as taught in U.S. Pat. No. 9,118,486 and U.S. Pat. No. 7,543,140.

Distributed ledgers provided in peer-to-peer systems, such as the blockchain used in the Bitcoin cryptocurrency system, rely on public/private cryptographic key pairs for the signing of transactions that transfer credits of commercial value between entities. In such systems, participants generate and manage their own public/private key pairs rather than relying on a third-party trusted central authority.

A problem in systems such as Bitcoin is that when a private key becomes compromised, for example by being made public, any entity knowing the private key can create and sign transfer messages to transfer credits allocated to the public key associated with the compromised private key, hence taking ownership of the credits. Some entities even run computer programs that constantly monitor compromised private keys and their associated public keys on the Bitcoin system, and transfer credits out as soon as they are credited to the compromised public key.

Another problem in systems such as Bitcoin is that a public key associated with the private key 0 is a valid key for transferring credits to, but the credits can never be redeemed. Due to the structure of the asymmetric key system used (the Elliptic Curve Digital Signature Algorithm, or ECDSA), credit transfer messages cannot be signed with the private key 0. As a result, the public key associated with the private key 0 currently holds a significant level of unredeemable credits. Computer programming errors can result in the accidental generation of the private key 0 rather than a valid private key, and subsequent accidental crediting of the public key associated with the private key 0, resulting in a permanent loss of the credits.

Both the aforementioned problems could be overcome by the existing prior art of key revocation lists produced and published by a trusted central authority in order to determine if a given cryptographic key has been compromised, and hence revoked. However, in distributed peer-to-peer systems, by definition there cannot be a trusted central authority to turn to, and so the prior art is of no use.

It is the intention of the present invention to address the shortcomings of the prior art, that is, the problem of reliably revoking a public/private cryptographic key pair used in a distributed peer-to-peer system in the absence of a trusted central authority.

SUMMARY OF THE INVENTION

In accordance with the present invention, a solution is provided for revoking cryptographic keys used in a peer-to-peer distributed ledger. The problem is an absence of a trusted central authority for issuing revocation lists, and the potential for the loss of, amongst other things: data privacy, control of virtual or on-line identities, and data of financial value, if private keys used on the system are compromised and cannot be revoked.

Embodiments of the invention are based on the use of the peer-to-peer distributed ledger as a medium for issuing key revocations to participants in the peer-to-peer system.

In one embodiment of the invention a first of a plurality of network connected devices may generate a key revocation message for a public/private key pair, for example, because the key has become compromised, because the entity owning the public/private key pair no longer wishes to use the key pair and wants to prevent others from doing so, or for some other reason.

The first of the plurality of network connected devices may transmit the key revocation message to a remainder of the plurality of network connected devices through the medium of a peer-to-peer network.

The remainder of the plurality of network connected devices may then verify that the message is well-formed according to, in for example one embodiment of the invention, a peer-to-peer network agreed standard for key revocation messages. If the key revocation message is deemed valid, the other network connected devices may append the key revocation message to their copy of the shared ledger. In this manner, the key revocation message is stored in the shared ledger for future retrieval and examination.

Subsequently, any request to append further messages to the shared ledger signed by the private key of the public/private key pair revoked in the key revocation message, or to transfer credits of commercial value to be associated with the public key of the public/private key pair revoked in the key revocation message, may be rejected by the plurality of network connected devices, in accordance with this embodiment of the invention.

In some embodiments of the invention the key revocation message may be signed by the first network connected device using the private key of the key pair to be revoked, or an associated public/private key pair, for example by using the EGDSA signature scheme, the ElGamal signature scheme, the Digital Signature Algorithm (DSA) signature scheme, or some other asymmetric key infrastructure.

In further embodiments of the invention the first network connected device may send to the peer-to-peer network an authorization for allowance of a future key revocation message of a first public/private key pair on the authority of a plurality of other public/private key pairs, and later the first network connected device or another network connected device may sign a key revocation message with a private key of one of the plurality of public/private key pairs, before submitting the key revocation message to the peer-to-peer network, in order to revoke the first public/private key pair. The authorization for allowance of a future key revocation message provides the authority for said key revocation message. Again all subsequent requests to add messages related to the first public/private key pair may subsequently be ignored by the plurality of the network connected devices on the peer-to-peer network.

The authorization for a future key revocation of the first public/private key pair may be signed by the network connected device using the private key of the public/private key pair referred to in the authorization, or an associated public-private key pair, for example using the ECDSA signature scheme, the ElGamal signature scheme, the DSA signature scheme, or some other asymmetric key infrastructure.

In another embodiment of the invention, on receiving a key revocation message or an authorization for a future key revocation message, any number of a plurality of network connected devices connected to the peer-to-peer network may attempt to perform a validation computation on the key revocation message or the authorization for a future key revocation message, and on succeeding in performing the validation computation, may then transmit the key revocation message or the authorization for a future key revocation message and a result of the validation computation to a remainder of the plurality of network connected devices connected to the peer-to-peer network for inclusion in a shared ledger.

The remainder of the plurality of network connected devices may then append to their copy of the shared ledger the key revocation message or the authorization for a future key revocation message and a one of the successful validation computations. Usually this will be a first successful validation computation received, and more details are provided below.

When the key revocation message or the authorization for a future key revocation message is submitted to the peer-to-peer network, a subset of the plurality of network connected devices associated with the peer-to-peer network may forward copies of the key revocation or the authorization for a future key revocation message to a remainder of the plurality of network connected devices, as is known to those familiar in the art of peer-to-peer network communication. Network connected devices on the peer-to-peer network may be standard nodes, in that they simply forward messages on to other devices on the peer-to-peer network, or they may be enhanced nodes, which are nodes that also perform validation computations on submitted key revocation messages or authorizations for future key revocation messages, in order to solve a proof-of-work or other computationally difficult problem that confirms to other standard nodes and enhanced nodes that the submitted message should be added to the shared ledger.

A first of the enhanced nodes to generate a successful result of the validation computation may submit the successful result, together with the key revocation message or the authorization for a future key revocation message, to the peer-to-peer network. The remainder of the standard nodes and enhanced nodes may then check the validation computation before adding the key revocation message or authorization for a future key revocation message and the result of the validation computation to the shared ledger if the validation computation is shown to be correct.

In order to provide an incentive for third parties to join the peer-to-peer network as standard nodes or enhanced nodes and process or review key revocation messages or authorizations for future key revocation messages, a commercially-valued credit system may be associated with the described system. When the validation computation result and the key revocation message or the authorization for a future key revocation message are submitted to the peer-to-peer network by the first of the enhanced nodes, the first of the enhanced nodes may also submit a notification that a number of commercially-valued credits are to be credited to a public key of a public/private key pair as specified by the enhanced node performing the validation computation. When the remainder of the plurality of network connected devices add the key revocation message and the result of the validation computation to the shared ledger, they also add this notification to the shared ledger.

In another embodiment, the key revocation message or the authorization for a future key revocation message submitted by the network connected device may contain an offer of commercially-valued credits that are allocated to a public key of a public/private key pair associated with the network connected device. The commercially-valued credits may then be claimed by the first of a plurality of network connected devices that produces a validation computation accepted into the public ledger, for example by including a transaction notification that reallocates the commercially-valued credits to a public key associated with the first of the plurality of network connected devices.

In the preceding preferred embodiment of the invention the commercially-valued credits are associated with the public key of a public/private key pair; however in other embodiments of the invention the commercially-valued credits may be associated with one or more of: a network address, an email address, a social security number, a credit card number, a bank account number, or other unique identifier.

Those skilled in the art will further appreciate the advantages and superior features of the invention together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the present invention. In the figures, like reference numerals designate corresponding parts throughout the different views.

DETAILED DESCRIPTION OF THE INVENTION

Figure 1:
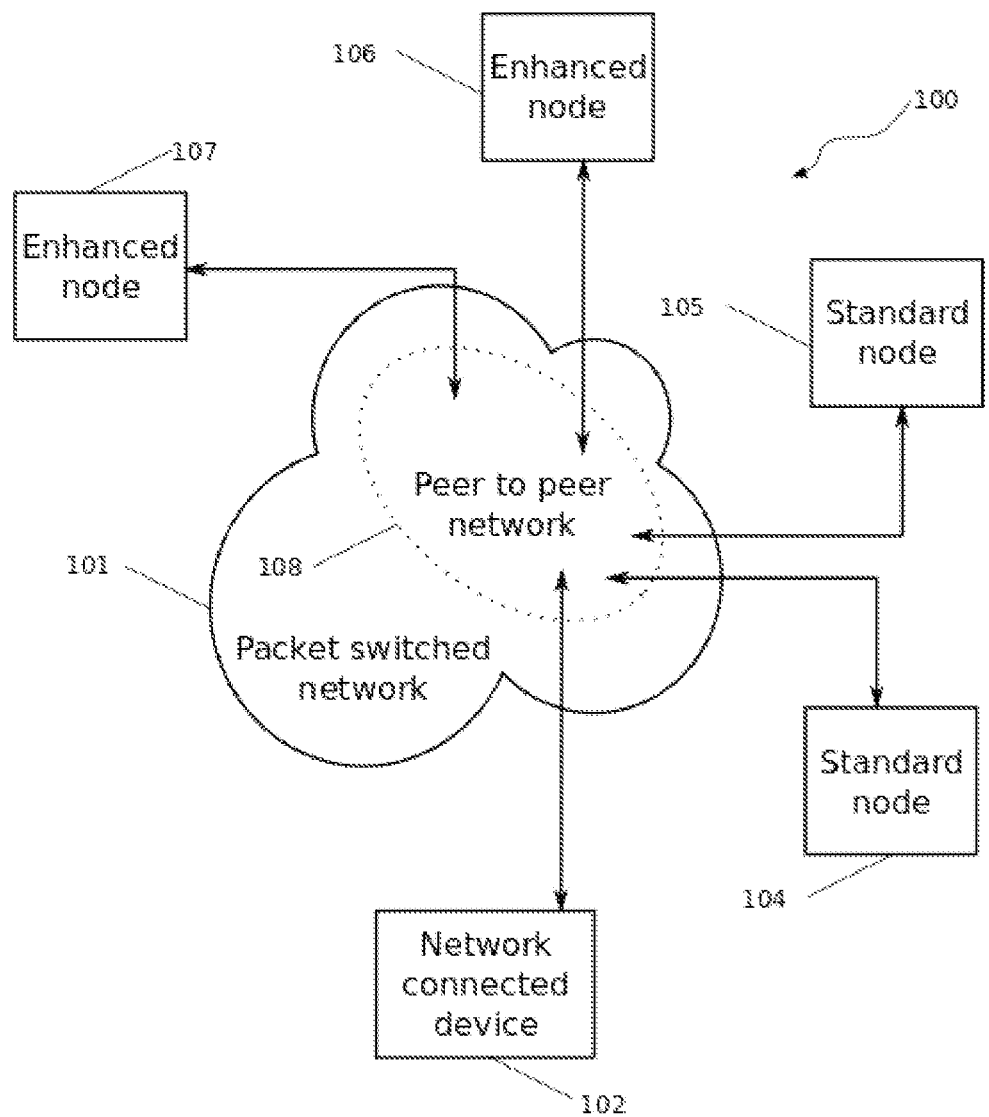
FIG. 1 illustrates a peer-to-peer network with a plurality of network connected devices connected to the peer-to-peer network, in accordance with an embodiment of the present invention.

Aspects of this disclosure will be described in the context of an exemplary system of a plurality of network connected devices communicating through the medium of a peer-to-peer network system 100, as shown schematically in FIG. 1. As depicted, the peer-to-peer network 108 is embodied within a packet switched network 101, through the interconnection of the plurality of network connected devices on the peer-to-peer network 108.

A network connected device 102 may connect to the peer-to-peer network through a direct connection to the packet switched network with a wired connection, or through a wireless connection by association with a wireless access point, a cellular base station, a Bluetooth connection, or other means of connection.

Other devices connected to the peer-to-peer network may include network connected devices acting as a "standard node" 104, 105 whose role is to maintain a list of other devices connected through the peer-to-peer network, and to forward on received network messages to those devices on the list, possibly independently, or possibly as a response to a request from another network connected device. As one skilled in the art will be aware, no individual standard node is required to have a complete list of all devices, as the process of peer-to-peer networking only requires that a union of a set of all standard nodes contains a complete list of all devices on the peer-to-peer network, and for every pair of network connected devices there is a network route from one device to the other, possibly via a set of one or more nodes. Therefore, the only requirement to be a participant on the peer-to-peer network is to establish a connection to one or more of the standard nodes on said network.

Further devices connected via the peer-to-peer network may include one or more network connected devices 106, 107 acting as an "enhanced node", whose role is to receive key revocation messages, authorizations for future key revocations, and other transaction messages from the peer-to-peer network; process them according to the methods and processes to be described further below; and transmit the results of said processing back to the peer-to-peer network for inclusion in a shared ledger.

The devices described above may each be implemented through a system comprising one or a plurality of: general purpose microprocessors, digital signal processors (DSPs), application specific instruction set processors (ASIPs), field programmable gate arrays (FPGAs), dedicated application specific integrated chips (ASICs), or other equivalent integrated or discrete logic circuitry and peripheral circuitry, connected to a tangible storage medium containing instructions that, when executed, effect methods and techniques described below. The techniques additionally, or alternatively, may be realized at least in part by a computer-readable communication medium or record carrier that carries or communicates code in the form of instructions or data structures and that can be accessed, read, and/or executed by a computer.

Figure 2:
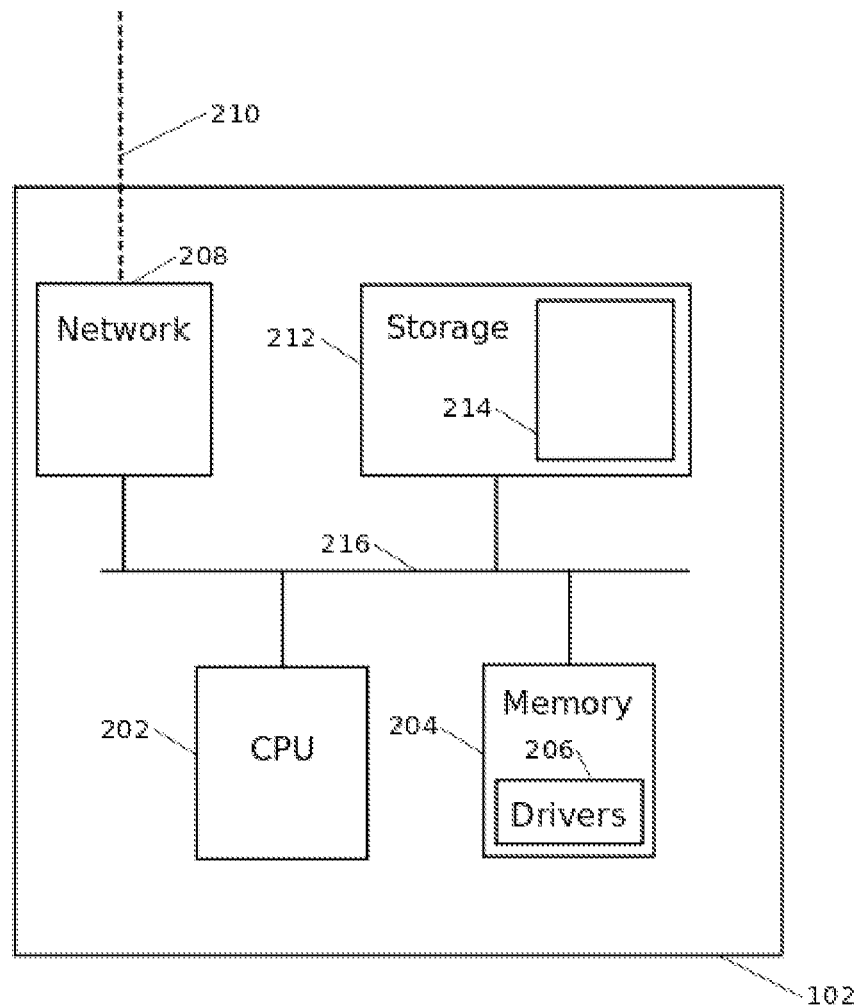
FIG. 2 illustrates a network connected device that may be utilized in the generation of a key revocation message or an authorization of a future key revocation message, in accordance with an embodiment of the present invention.

An embodiment of the network connected device 102 is presented in FIG. 2, and is now discussed in further detail. The network connected device 102 may comprise a CPU 202 capable of executing instructions stored in a memory 204, and controlling other peripheral components through drivers 206 stored within the memory 204.

Further storage 212 may be present, which may contain a cryptographically secure partition or component 214, where cryptographic keys may be securely stored.

The network connected device 102 may connect to the packet switched network through a network module 208, which may consist of a direct wired connection to the packet switched network through a cable 210. In a different embodiment of the invention, the network module 208 may contain wireless components comprising one or more wireless modules implemented in firmware or hardware, including a wireless local area network (WLAN) unit such as an adapter utilizing an 802.11 protocol, a wireless wide area network (WWAN) unit such as Global Standard for Mobile communications (GSM), Long-Term Evolution (LTE), or other cellular wireless data communication system, or a Bluetooth unit. The wireless components may provide network connectivity to a packet switched network and hence to the peer-to-peer network for the network connected device.

Components comprising the network connected device may communicate through a bus 216, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

Figure 3A:
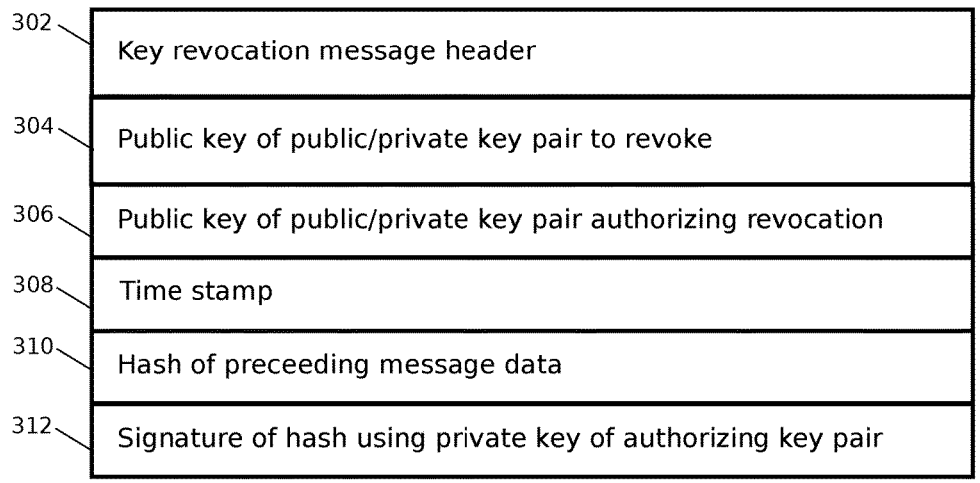
FIG. 3A is a block diagram illustrating a structure of a possible embodiment of a key revocation message, in accordance with an embodiment of the present invention.

FIG. 3A presents a possible embodiment of a key revocation message. The key revocation message header 302 may contain a marker indicating that the rest of the message contains key revocation data, and other header information such as the length of the message.

The key revocation message may contain a public key 304 of a public/private key pair to be revoked.

The key revocation message may contain a public key 306 of a public/private key pair authorizing the revocation of the public key 304. In a preferred embodiment of the invention the keys 304 and 306 may comprise the same key.

The key revocation message may contain a time stamp 308, which in one embodiment of the invention may be used to indicate from when the key revocation is valid. Through these means it is possible to provide a public/private key pair with a limited validity period, for example by specifying a time stamp in the future. In another embodiment the time stamp may be the current time, thereby revoking the public/private key pair at the point the key revocation is sent.

The key revocation message may also comprise a hash 310 of the preceding message content. The hash may be one of a Secure Hash Algorithm (SHA), RACE Integrity Primitives Evaluation Message Digest (RIPEMD), Whirlpool, Scrypt, HAS-160, BLAKE, or other cryptographic hash function applied to all or part of the preceding content of the message, where a hash output cannot be determined from hash input other than by the application of the cryptographic hash function to the hash input.

The key revocation message may also comprise a digital signature 312, generated with the private key associated with the authorizing public key 306 and the hash 310, in order to provide for the veracity of the key revocation message. The digital signature algorithm used may be one of ECDSA, DSA, Rivest-Shamir-Adleman (RSA), or some other secure asymmetric key digital signing algorithm.

Figure 3B:
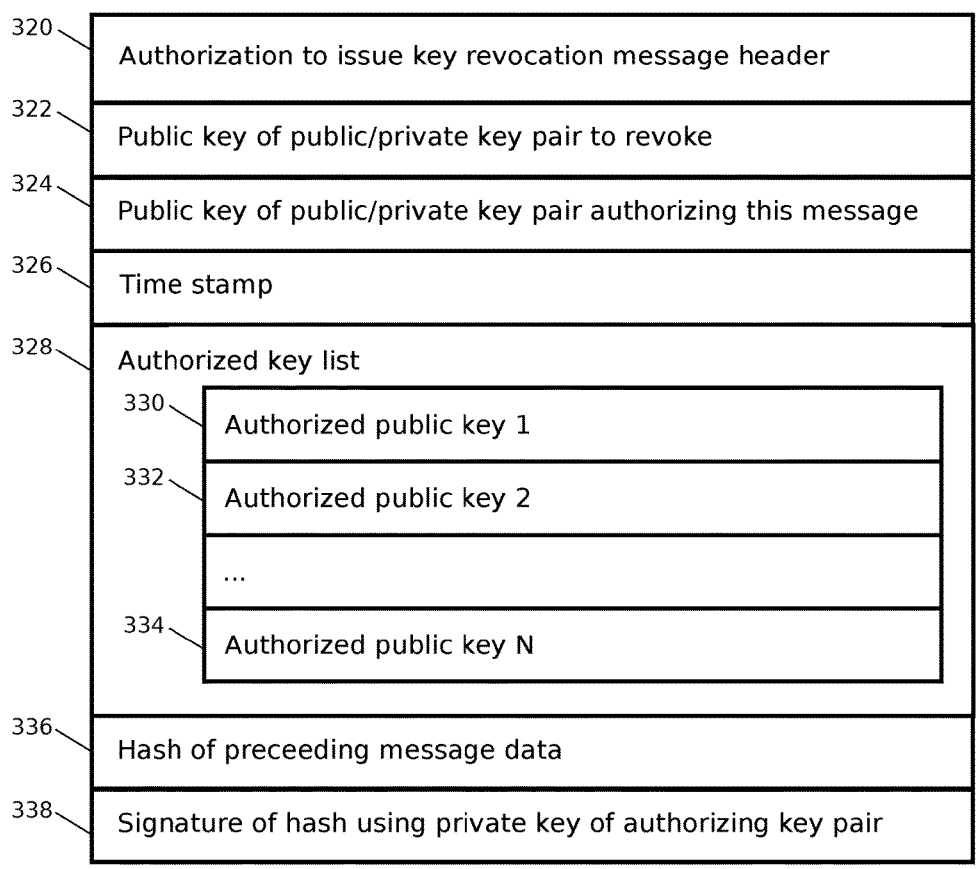
FIG. 3B is a block diagram illustrating a structure of a possible authorization of a future key revocation message, according to one embodiment of the invention.

FIG. 3B presents a possible embodiment of an authorization for a future key revocation message. The authorization for a future key revocation message header 320 may contain a marker indicating that the rest of the message contains key revocation data, and other header information such as the length of the message.

The authorization for a future key revocation message may contain a public key 322 of a public/private key pair to be revoked at some point in the future.

The authorization for a future key revocation message may contain a public key 324 of a public/private key pair authorizing the issue of the authorization for a future key revocation message of the public key 322. In a preferred embodiment of the invention the keys 322 and 324 may comprise the same key.

The authorization for a future key revocation message may contain a time stamp 326, which in one embodiment of the invention may be used to indicate from what point in time the authorization for a future key revocation message is valid. Through these means it is possible to provide an authorization message with a validity period that starts in the future. In another embodiment the time stamp may be the current time, thereby immediately validating the authorization for a future key revocation message at the point the message is sent.

The authorization for a future key revocation message may contain an authorized key list 328. Within the list there may be listed any number of authorized public keys (330, 332, up to 334 in this example) of a plurality of public/private key pairs, for which authorization is provided to sign a future key revocation message by the authorization for a future key revocation message. By these means, the holder of an authorized key pair for which the public key is listed may sign a future key revocation for the public key 322, using the private key associated with the authorized public key, thereby revoking the public/private key pair associated with the public key 322.

The authorization for a future key revocation message may also comprise a hash 336 of the preceding message content. The hash may be one of a SHA, RIPEMD, Whirlpool, Scrypt, HAS-160, BLAKE, or other cryptographic hash function applied to all or part of the preceding content of the message, where a hash output cannot be determined from hash input other than by the application of the cryptographic hash function to the hash input.

The authorization for a future key revocation message may also comprise a digital signature 338, generated with the private key associated with the authorizing public key 324 and the hash 336, in order to provide for the veracity of the authorization of a future key revocation message. The digital signature algorithm used may be one of ECDSA, DSA, RSA, or some other secure asymmetric key digital signing algorithm.

Figure 4:
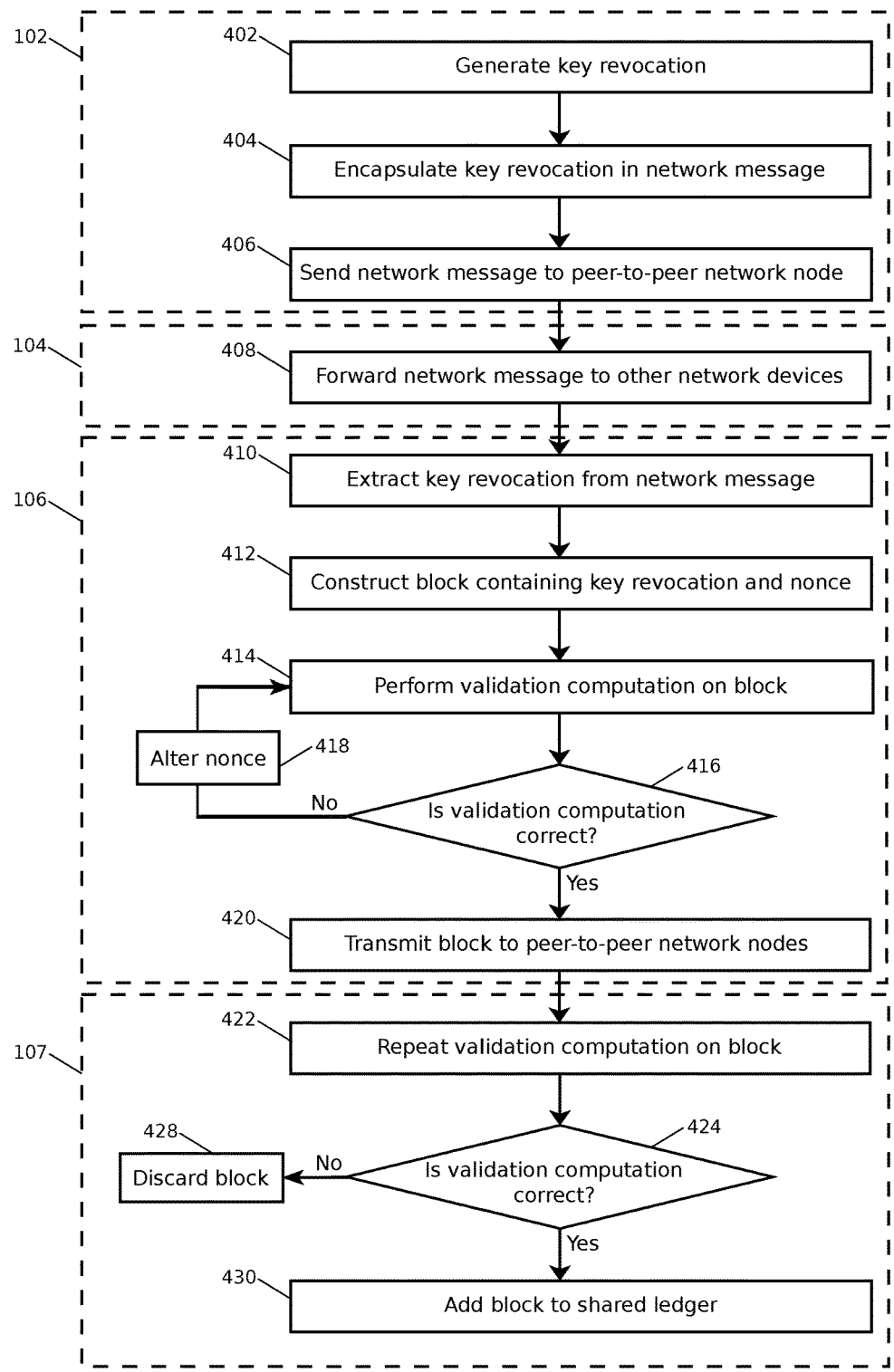
FIG. 4 is a signal flow diagram providing a general overview of a and apparatus controlling the flow of the key revocation message data from the first of the plurality of network connected device to the plurality of network connected devices connected via the peer-to-peer network for eventual inclusion in a shared ledger.

A high level flow diagram illustrating one possible embodiment of the system and the steps taken therein is presented in FIG. 4. Note that although the specific embodiment and example provided by FIG. 4 is for the generation and inclusion of a key revocation message in the shared ledger, the same flow diagram and associated methods and processes apply to the generation and inclusion of an authorization for a future key revocation. From here on "a key revocation message" can be equally read as "an authorization for a future key revocation message".

The interaction of the network connected device 102 with the plurality of network connected devices, and specifically a network connected device functioning as a standard node 104, and a network connected device functioning as an enhanced node 106, and finally another one of the plurality of network connected devices 107, is shown. The flow of data comprising the generation of the key revocation message, inclusion in a successfully generated block of data, and the appending of said block of data to the shared ledger is also illustrated through FIG. 4.

Once the network connected device 102 has determined the need to revoke a key pair, it may generate a key revocation message 402. The key revocation message may then be encapsulated in a network message 404 and sent on to the peer-to-peer network 406.

Once the key revocation message encapsulated in the network message has been received by a network connected device acting as a standard node 104, the node may forward the message to other network connected devices on the peer-to-peer network 408. Other network connected devices may also make requests to the standard node for network messages that they have not yet received. Through these means, the key revocation message encapsulated in the network message is forwarded to all interested parties on the peer-to-peer network.

Through these network interactions, the key revocation message encapsulated in the network message may arrive at a network connected device acting as an enhanced node 106. The enhanced node may then extract the key revocation message from the network message as per step 410. After the key revocation message has been obtained, the enhanced node may construct a block of data containing the key revocation message, a nonce, and any other messages that the enhanced node has previously received and that have not yet been included in the shared ledger, as noted in step 412. The block of data may also contain other messages and elements, which will be detailed further below. The enhanced node may then perform a validation computation on the block of data 414, further details of which will be provided below. For now, it suffices to note that the validation computation may either return a correct result, or a failure as per step 416. If the validation computation returns a failure, the enhanced node may alter the nonce as per step 418, for example if it is an integer by incrementing or decrementing the value of the number by a chosen amount, or by choosing a new random value, and may then repeat the validation computation on the new block as per step 414. If the validation computation is correct, the block of data has been successfully verified and the enhanced node may transmit the block of data to the peer-to-peer network 420.

Through transmission to the peer-to-peer network, the block of data may arrive at another network connected device 107, which may constitute another enhanced node, or another standard node. The network connected device 107 may then repeat the same validation computation on the block 422 as previously performed by the enhanced node 106 in step 414, and the validation computation may return either a successful result or a failure 424. If the computation result is a failure, the network connected device 107 may discard the block, as shown in step 428. If the validation computation produces a successful result, then the network connected device 107 may add the block of data to a copy of the shared ledger 430.

Figure 5:
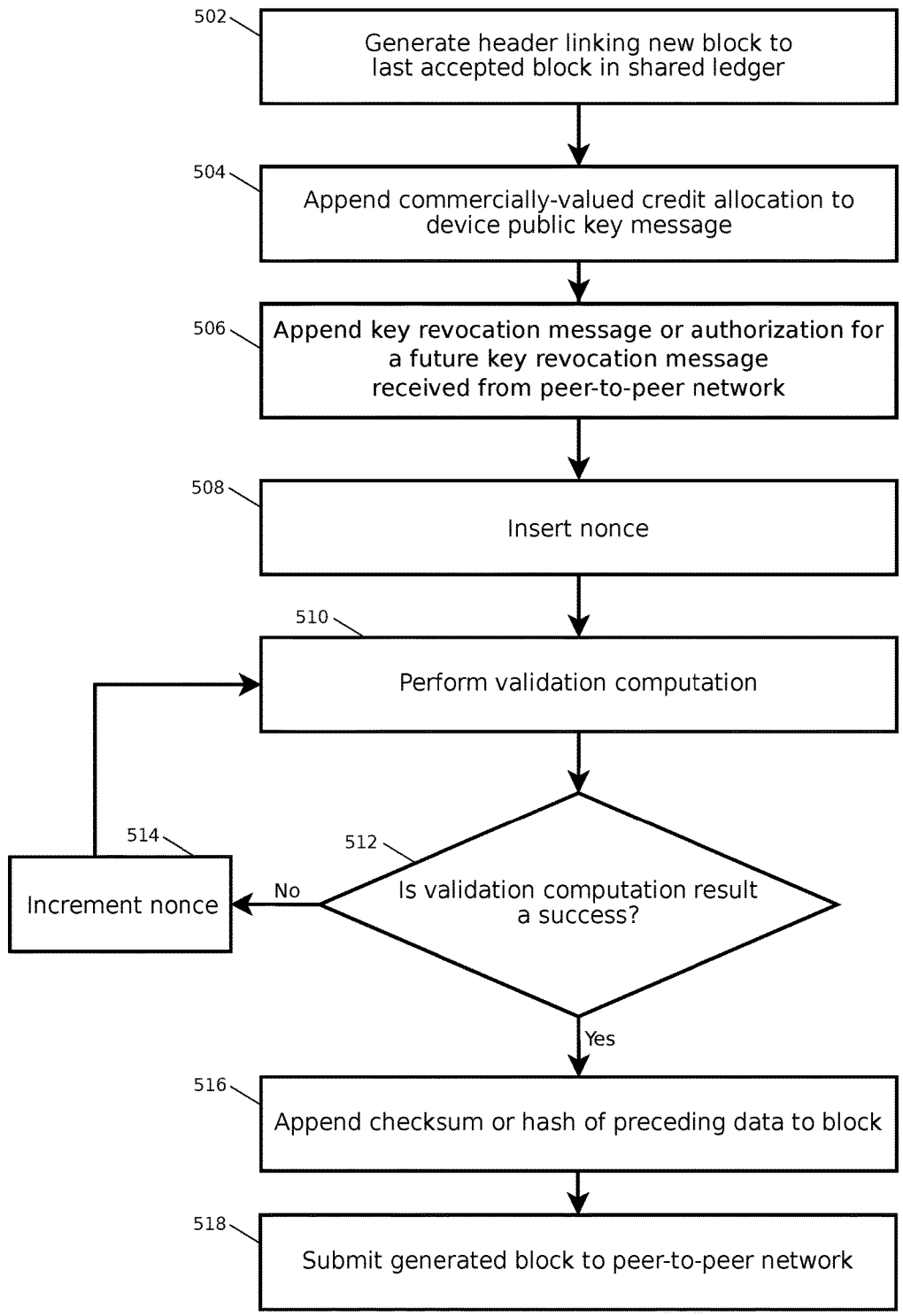
FIG. 5 is a flowchart illustrating a method for generating a valid block of data containing a key revocation message and a commercially-valued credit allocation for inclusion in the shared ledger, according to one embodiment of the invention.

FIG. 5 presents a flowchart providing further details for one possible embodiment of an enhanced node, and provides a specification for the steps that may be taken once a key revocation message or an authorization for a future key revocation message has been received by a network connected device acting as an enhanced node.

In step 502 the enhanced node generates a header for a new block of data, which in one embodiment may contain data indicating the start of the block of data, and may contain a link back to the last accepted block of data in the shared ledger, for example through inclusion of a hash of the previous block of data. The header may also contain a time stamp.

In step 504 the enhanced node may append a message to the block, commonly known to those skilled in the art as a "block reward", which allocates a number of commercially-valued credits to a public key associated with a network connected device. In other embodiments the number of commercially-valued credits may be associated with one or more of: an email address, an Internet Protocol address (IP address) or a media access control address (MAC address).

In step 506 the enhanced node may append none, one, or a plurality of key revocation messages, authorizations for a future key revocation message, or other data, received through the peer-to-peer network, to the block of data. The enhanced node may al so append a count of the number of messages or the size of the data added to the block of data.

In step 508 the enhanced node may insert a nonce into the block of data. The nonce may comprise a number, a string, or binary data, and may be selected randomly or according to a predetermined algorithm. For example, the nonce may initially be the number 1, and subsequently incremented by one for each repetition until a successful result is returned from the validation computation.

In step 510 the enhanced node may conduct a validation computation on the block in its current state. The validation computation may comprise applying a one or more hash functions to the block, and then possibly applying the one or more hash functions or a different one or more hash functions repeatedly one or more times to the output of the previous hash function applied. The hash functions used may include SHA, RIPEMD, Whirlpool, Scrypt, HAS-160, BLAKE, or other cryptographic hash function where a hash output cannot be determined from hash input other than by the application of the cryptographic hash function to the hash input. A final result of step 510 may be a number.

In step 512 the final result may be compared to a target value. The target value may be a fixed value agreed upon by a plurality of participating devices in the peer-to-peer network, or it may be a dynamic value determined in one embodiment by the average time taken for the enhanced nodes in the peer-to-peer network to produce the last K blocks of data, where K is a fixed value agreed upon by the plurality of participating devices in the peer-to-peer network. When the final result of the validation computation is compared to the target value, the result may be determined to be successful if the final result is greater than the target. In other embodiments of the invention the result may be determined to be successful if the final result is greater or equal to the target value, or less than the target value, or less than or equal to the target value, or by some other Boolean operation on the final result and the target value.

If the result of step 512 is "no", then step 514 may be executed. The enhanced node may alter the nonce in the block, for example by incrementing its value if it is a number, or by selecting a new nonce at random, and may then proceed to step 510 again. The repeated cycle of step 510, step 512, and step 514 is often described in the art as a "proof of work" effort.

If the result of step 512 is "yes", then step 516 may be executed. The enhanced node may append a checksum or cryptographic hash to the block, which allows third parties to verify that the preceding data is correct and has not been altered or corrupted during data transfer.

Finally, the enhanced node may execute step 518, by sending the completed block of data to the peer-to-peer network for inspection by other network connected devices, and subsequent inclusion in the shared ledger.

Figure 6:
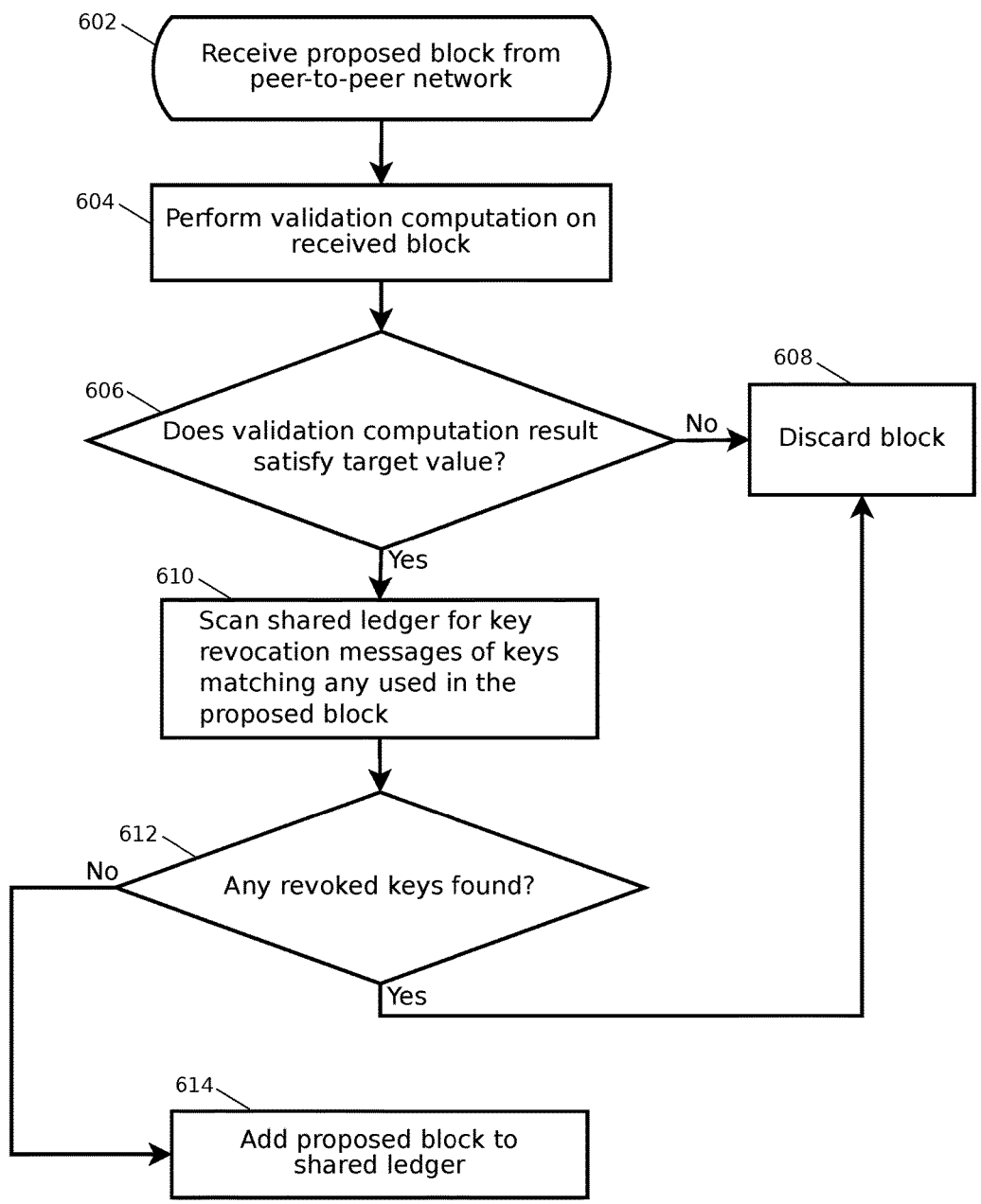
FIG. 6 is a flowchart illustrating a method for processing a block containing a key revocation message and determining whether it may be included in the shared ledger, according to one embodiment of the invention.

A method for verifying a block of data that may contain a message signed by a key revoked by a previous key revocation message, submitted to the peer-to-peer network by an enhanced node, by one possible embodiment of a network connected device henceforth referred to as a verifier, is presented in FIG. 6. In step 602 the network connected device may receive the block of data from the peer-to-peer network.

In step 604 the network connected device may perform the same validation computation on the submitted block as performed by the enhanced node.

In step 606 the verifier may examine a result to determine if the block of data satisfies the validation computation. If the result is "no", the network connected device may proceed to step 608, in which the block of data is discarded. If the result is "yes", the network connected device may proceed to step 610.

In step 610 the verifier may scan the shared ledger to determine if any of the keys used in the block of data for signing messages have previously been revoked by a key revocation message stored in the shared ledger. In another embodiment the verifier may previously have scanned the shared ledger and constructed a list of revoked keys, which may be used to determine if any of the keys used in the block of data for signing messages have previously been revoked.

The result from step 610 may be evaluated by the verifier in step 612. If the result of step 612 is "yes", then one or more revoked keys may have been found to have been used in signing messages in the block of data, and the verifier may proceed to step 608, in which the block of data is discarded. If the result of step 612 is "no", then no revoked keys were found, and the verifier may proceed to step 614, in which the block of data is added to the shared ledger.

As will be appreciated from the above discussion, an advantage of the systems and methods of this disclosure includes the revocation of compromised keys used within a distributed peer-to-peer shared ledger, a file, or a database. The techniques also allow for rewarding of owners of network connected devices participating in the process of revoking keys and charging of owners or users of network connected devices requesting the revocation of keys used in the peer-to-peer network system.

What is claimed is:

1. A method for revoking keys used in a shared ledger distributed through a peer-to-peer network comprising:
   sending, from a first of a plurality of network connected devices connected to the peer-to-peer network to the remainder of the plurality of network connected devices, an authorization message for a future key revocation of a first public/private key pair on an authority of one or more of a plurality of public/private key pairs;
   appending the authorization message, by the plurality of network connected devices, to the shared ledger;
   generating, by a second of the plurality of network connected devices, a key revocation message for the first public/private key pair;
   signing the key revocation message, by the second of the plurality of network connected devices, with a private key of one of the plurality of public/private key pairs;
   transmitting the key revocation message from the second of the plurality of network connected devices to the remainder of the plurality of network connected devices;
   appending the key revocation message, by the plurality of network connected devices, to the shared ledger; and
   rejecting, by the plurality of network connected devices, any subsequent request to append to the shared ledger a further message signed by the first private key of the first public/private key pair.

2. The method of claim 1, further comprising:
   signing the authorization message, by the first of the plurality of network connected devices, using the first private key of the first public/private key pair.

3. The method of claim 1, wherein the plurality of public/private key pairs comprises the first public/private key pair.

4. The method of claim 1, further comprising:
performing a validation computation on the key revocation message by the second of the plurality of network connected devices;
transmitting the key revocation message and a result of the validation computation from the second of the plurality of network connected devices to the remainder of the plurality of network connected devices connected; and
appending the key revocation message and the result of the validation computation, by the plurality of network connected devices, to the shared ledger.

5. The method of claim 4, further comprising:
producing the result of the validation computation, by the second of the plurality of network connected devices, before any of the remainder of the plurality of network connected devices;
creating a record of a number of commercially-valued credits associated with a second public key of a second public/private key pair, by the second of the plurality of network connected devices; and
including the record of the number of commercially-valued credits in the shared ledger with the result of the validation computation and the key revocation message, by the plurality of network connected devices.

6. The method of claim 5, further comprising:
including in the authorization message, by the first of the plurality of network connected devices, an offering of the number of commercially-valued credits associated with a further public key and recorded on the shared ledger; and
transferring said number of commercially-valued credits to the second public key of the second public/private key pair, by the plurality of network connected devices, when including the key revocation message in the shared ledger.

7. The method of claim 5, wherein the commercially-valued credits are associated with one or more of: a network address, a cryptographic key, or an email address.

8. A plurality of network connected devices, each comprising:
one or more processors and storage media comprising computer instructions, said plurality of network connected devices being connected via a peer-to peer network to each other, arranged such that, when the computer instructions are executed on the one or more processors of one or more of the plurality of network connected devices, operations are caused comprising:
sending, from a first of the plurality of network connected devices to the remainder of the plurality of network connected devices, an authorization message for a future key revocation of a first public/private key pair on an authority of one or more of a plurality of public/private key pairs;
appending the authorization message, by the plurality of network connected devices, to a shared ledger;
generating, by a second of the plurality of network connected devices, a key revocation message for the first public/private key pair;
signing the key revocation message, by the second of the plurality of network connected devices, with a private key of one of the plurality of public/private key pairs;
transmitting the key revocation message from the second of the plurality of network connected devices to the remainder of the plurality of network connected devices;
appending the key revocation message, by the plurality of network connected devices, to the shared ledger; and
rejecting, by the plurality of network connected devices, any subsequent request to append to the shared ledger a further message signed by a first private key of the first public/private key pair.

9. The plurality of network connected devices of claim 8, further comprising computer instructions that, when executed on one or more processors of the first of the plurality of network connected devices, cause operations comprising:
signing the authorization message, by the first of the plurality of network connected devices, using the first private key of the first public/private key pair.

10. The plurality of network connected devices of claim 8, wherein the plurality of public/private key pairs comprises the first public/private key pair.

11. The plurality of network connected devices of claim 8, further comprising computer instructions that, when executed on one or more processors of one or more of the plurality of network connected devices, cause operations further comprising:
performing a validation computation on the key revocation message by the second of the plurality of network connected devices;
transmitting the key revocation message and a result of the validation computation from the second of the plurality of network connected devices to the remainder of the plurality of network connected devices connected; and
appending the key revocation message and the result of the validation computation, by the plurality of network connected devices, to the shared ledger.

12. The plurality of network connected devices of claim 11, further comprising computer instructions that, when executed on one or more processors of one or more of the plurality of network connected devices, cause operations further comprising:
producing the result of the validation computation, by the second of the plurality of network connected devices, before any of a remainder of the plurality of network connected devices;
creating a record of a number of commercially-valued credits associated with a second public key of a second public/private key pair, by the second of the plurality of network connected devices; and
including the record of the number of commercially-valued credits in the shared ledger with the result of the validation computation and the key revocation message, by the plurality of network connected devices.

13. The plurality of network connected devices of claim 12, further comprising computer instructions that, when executed on one or more processors of one or more of the plurality of network connected devices, cause operations further comprising:
including in the authorization message, by the first of the plurality of network connected devices, an offering of the number of commercially-valued credits associated with a further public key and recorded on the shared ledger; and
transferring the number of commercially-valued credits to the second public key of the second public/private key pair, by the plurality of network connected devices, when including the key revocation message in the shared ledger.

14. The plurality of network connected devices of claim 12, wherein the commercially-valued credits are associated with one or more of: a network address, a cryptographic key, or an email address.

* * * * *